United States Patent

Polmanteer

[11] Patent Number: 5,486,551
[45] Date of Patent: Jan. 23, 1996

[54] METHOD FOR PREPARING A FINELY DIVIDED, FREE FLOWING ORGANOSILOXANE ELASTOMER BASE EXHIBITING REDUCED COMPRESSION SET FOLLOWING CURING

[75] Inventor: Keith E. Polmanteer, Midland, Mich.

[73] Assignee: Dow Corning Corporation, Midland, Mich.

[21] Appl. No.: 368,065

[22] Filed: Jan. 3, 1995

[51] Int. Cl.$^6$ .................................................. C08K 9/06
[52] U.S. Cl. ........................................ 523/212; 523/213
[58] Field of Search ................................... 523/212, 213

[56] References Cited

U.S. PATENT DOCUMENTS

| | | | |
|---|---|---|---|
| 3,635,743 | 1/1972 | Smith | 106/288 |
| 3,824,208 | 7/1974 | Link et al. | 260/375 |
| 4,785,047 | 11/1988 | Jensen | 524/714 |
| 4,882,368 | 11/1989 | Elias et al. | 523/213 |
| 4,898,898 | 2/1990 | Fitzgerald et al. | 523/351 |
| 5,008,305 | 4/1991 | Kennan et al. | 523/212 |
| 5,081,172 | 1/1992 | Chaffee et al. | 524/188 |
| 5,153,238 | 10/1992 | Bilgrien et al. | 523/211 |

FOREIGN PATENT DOCUMENTS 2102007   4/1990   Japan.

OTHER PUBLICATIONS

"Reinforcement of Silicone Rubber by Particulate Silica" Boostra, Cochrane, Dannenberg; Cabot Corporation, Billerica, Mass. pp. 29–39, Jan. 1976.

*Primary Examiner*—Melvyn I. Marquis
*Attorney, Agent, or Firm*—Robert Spector

[57] ABSTRACT

The compression set values of cured elastomers prepared from finely divided organosiloxane elastomer bases are reduced by treating the base with a silane or disilazane wherein the silicon atoms are bonded to one hydrolyzable group and three hydrocarbon radicals that are free of ethylenic unsaturation. The base is maintained in a fluidized state during this treatment.

4 Claims, No Drawings

METHOD FOR PREPARING A FINELY DIVIDED, FREE FLOWING ORGANOSILOXANE ELASTOMER BASE EXHIBITING REDUCED COMPRESSION SET FOLLOWING CURING

BACKGROUND OF THE INVENTION

1. Field of the Invention

This invention relates to organosiloxane elastomer compositions in the form of a flowable powder. More particularly, this invention relates to a method for processing organosiloxane elastomer bases to substantially reduce the compression set of cured elastomers prepared using these bases. The bases comprise a gum type polydiorganosiloxane and a reinforcing filler that has been treated to reduce the occurrence of a phenomenon referred to as "creping" or "crepe hardening".

Compression set for elastomeric materials is defined as the residual deformation of the elastomer following removal of a compressive stress applied for a specified period of time. Compression set is measured thirty minutes after removal of the test specimen from a loading device in which the specimen had been subjected for a definite time to compression deformation under specified conditions of load application and environmental conditions. Compression set is an important property for many applications of elastomers, particularly in applications such as seals and gaskets.

The prior art describes various methods for processing curable organosiloxane compositions to reduce the compression set of cured elastomers prepared using these compositions. For example, U.S. Pat. No. 5,008,305, which issued on Apr. 16, 1991 describes treating a reinforcing silica with the combination of 1) an alkoxysilane containing one or two vinyl radicals per molecule and 2) an alkoxysilane containing 1 or 2 phenyl radicals per molecule.

U.S. Pat. No. 4,882,368, which issued on Nov. 21, 1989, teaches reacting a silanol-terminated polyorganosiloxane containing at least 80 mole percent of methyl-3,3,3-trifluoropropyl units with a silazane of the general formula $X_2NH$ wherein X represents a silyl group selected from methylphenylvinylsilyl,

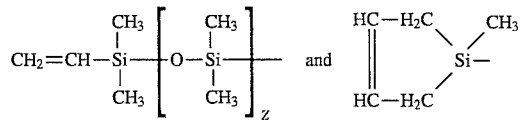

U.S. Pat. No. 4,785,047, which issued on Nov. 15, 1988 describes a method for preparing silica-filled liquid organosiloxane compositions that cure by a platinum-catalyzed hydrosilation reaction to clear elastomers. The characterizing feature of the method is using a hexaorganodisilazane as at least a portion of an initial silica treating agent and following this with a second portion of disilazane that is equivalent to at least 5 weight percent of the disilazane present in the initial silica treating agent. Both portions of the disilazane are added during preparation of the curable organosiloxane composition.

U.S. Pat. No. 5,081,172, which issued on Jan. 14, 1992 to Chaffee et al. describes a method for reducing the compression set of a cured elastomer prepared from an organosiloxane elastomer base by blending the base with one of the ethylenically unsaturated disilazanes described in U.S. Pat. No. 4,882,368. The silica was treated with an organosilicon compound containing silanol or silicon-bonded hydrolyzable groups.

The ethylenically unsaturated disilazanes described in the Chaffee et al. patent react during curing of the base to form additional crosslinks. The resulting change in the physical properties of the cured elastomer may be undesirable for some end use applications.

Treatment of a reinforcing silica filler with ammonia followed by treatment with hexamethyldisilazane for the purpose of improving the storage stability of the composition and the physical properties of cured elastomers prepared from the composition is described in U.S. Pat. No. 3,635,743, that issued on Jan. 8, 1972.

The preparation of an organosiloxane elastomer base in the form of flowable powder is described in U.S. Pat. Nos. 3,824,208, which issued to Link and Scarbel on Jul. 16, 1974, commonly assigned British patent no. 2,147,598, and Japanese patent publication no. 2/102007, which was published on Apr. 13, 1990.

In accordance with the teaching of Link and Scarbel in the aforementioned patent, the finely divided base is prepared by first reducing the particle size of the polydiorganosiloxane to within the range of from 0.1 micron to 25.4 mm. by suitable means and then mixing the particles with at least 15 parts by weight of a reinforcing filler. This operation is conducted at a temperature of from 0 to 100 degrees C. preferably from 20 to 60 degrees C. A second critical process parameter in addition to the temperature is the speed of the tip of the blade in the mixer or other device used to subdivide the polymer and blend it with the filler during preparation of the powdered material. In accordance with the teaching of the patent, this speed can generally range from 50 to 150 feet per second and is preferably from 70 to 150 feet per second.

British patent no. 2,147,598, published on May 15, 1985 teaches a method for densifying the reinforcing and extending fillers used in organosiloxane compositions prepared using polyorganosiloxanes exhibiting viscosities from 1000 to 200,000,000 centipoise (1 to 200,000 Pa.s). The method comprises blending 100 parts by weight of the polydiorganosiloxane with from 50 to 500 parts by weight of a reinforcing filler or 400 to 5000 parts by weight of a non-reinforcing or extending filler. The vessel in which the blending is carried out is similar to the ones described in U.S. Pat. No. 3,824,208, with the exception that the mixing time in substantially longer in order to achieve the desired increase in particle density.

Japanese patent publication no. 2/102007 teaches blending a finely divided high consistency or "gel" type vinyl-containing polydiorganosiloxane having a viscosity of at least $1\times10^5$ centipoise with a filler. A processing aid is included to prevent a phenomenon referred to as "creping" or "crepe hardening". The resultant mixture is then fed into a mixing apparatus equipped with a high speed rotating blade that is capable of subjecting the mixture to high speed mechanical shearing. During this step of the process the mixture achieves the consistency of a free-flowing powder. The critical parameters for obtaining a free flowing powder are the speed of the blade tip and the residence time of the mixture in the mixing apparatus.

U.S. Pat. No. 5,153,238, which issued on Oct. 4, 1992 teaches that formation of gel particles in finely divided organosiloxane elastomer bases can be avoided or substantially reduced by using a set of process conditions for preparing the bases that is beyond the limits and conditions described in the previous art. In addition to elimination of the gel particles the physical properties of cured elastomers prepared from the bases composition are substantially improved.

In accordance with the method described in U.S. Pat. No. 5,153,238, the reinforcing silica filler is maintained in a highly turbulent, fluidized state and at a temperature of from 100 to 200° C. prior to addition of the polydiorganosiloxane, and the resultant mixture is subjected to shearing forces sufficient to rapidly reduce the ultimate particle size of the mixture to within the range of from 1 to 1000 microns. The entire process requires up to about one hour, depending upon the amount of filler and the desired particle size of the final product. The progress of the particle size reduction can be monitored by observing the electrical power consumed by the chopper blade(s) used to reduce the size of the ultimate particles and the blade(s) used to remove material from the wall of the mixing chamber and transport it to the chopper blade(s).

In attempting to reduce the compression set of a finely divided non-creping organosiloxane elastomer base by blending the base with various silica treating agents to further reduce the concentration of silanol groups in the base, the present inventor discovered that the reduction in compression set obtained using triorganosilanes containing a hydrolyzable group or hexaorganodisilazanes wherein the three hydrocarbon radicals bonded to each silicon atom are free of ethylenic unsaturation was at least as great as the decrease obtained using the ethylenically unsaturated hexaorganodisilazanes required by the prior art without substantially affecting other desirable physical properties of the cured elastomer. The present invention is based on this discovery.

SUMMARY OF THE INVENTION

The compression set values of cured elastomers prepared from finely divided organosiloxane elastomer bases are reduced by treating a non-creping form of the base with a silane, disiloxane or disilazane wherein the silicon atoms are bonded to one hydrolyzable group and three hydrocarbon radicals that are free of ethylenic unsaturation. The base is maintained in a fluidized state during this treatment.

DETAILED DESCRIPTION OF THE INVENTION

This invention provides a method for reducing the compression set of a cured elastomer prepared from an organosiloxane elastomer base, in the form of a free flowing powder, said method comprising the following sequential steps:

1) maintaining in the fluidized state a finely divided form of a previously prepared non-creping organosiloxane elastomer base comprising a curable polyorganosiloxane gum and reinforcing silica filler having silanol groups on the surface thereof, wherein a portion of said silanol groups sufficient to prevent crepe hardening have been converted to organosiloxy groups during preparation of said base;

2) blending said base with an organosilicon compound of the general formula $R^1_3SiX$ or $(R^1_3Si)_2NR^2$ under conditions sufficient to react said compound with at least a portion of the residual silanol groups in said base, wherein the molar ratio of said organosilicon compound to the combined concentration of silanol and silicon-bonded hydrolyzable groups present in said base is at least 0.5:1, and 3) isolating the resultant organosiloxane composition as a free flowing powder;

wherein each $R^1$ is individually selected from monovalent hydrocarbon radicals free of ethylenic unsaturation, X represents a hydrolyzable group and $R^2$ is selected from the group consisting of hydrogen and $R^1$.

The characterizing feature of the present method involves the reaction with a specified class of organosilicon compounds of a finely divided, free flowing organosiloxane elastomer base comprising at least one gum-type polydiorganosiloxane and a reinforcing silica filler that has been treated to reduce a phenomenon referred to in the art as "creping" or "crepe hardening". The base is reacted with a stoichiometric excess, based on the number of silanol and hydrolyzable groups present in the base, of a class of organosilicon compounds containing one or two silicon atoms, each of which contains three hydrocarbon radicals and a hydrolyzable group. The hydrocarbon radicals are free of ethylenic unsaturation. When the base contains silicon-bonded hydrolyzable groups, sufficient water is optionally added together with the organosilicon compound to convert the hydrolyzable groups to silanol groups.

A phenomenon known as "crepe hardening" or "creping" takes place when a polydiorganosiloxane and a high surface area amorphous silica filler are mixed. During storage the mixture becomes difficult to handle because the polymer and the silica interact and a softening process, such as milling the base, is required. To reduce this effect, the bases are mixed and heated, especially in the presence of a silica treating agent, such as hydroxyl-terminated polydiorganosiloxane fluids, for example hydroxyl-terminated polydimethylsiloxane fluids, hydroxyl-terminated polymethylphenylsiloxane fluids, and hydroxyl terminated poly(methyl-3,3,3-trifluoropropyl)siloxane fluids, diphenylsilanediol, various silazanes, and other hydroxyl and alkoxy organosiloxane compounds.

It is believed that the treating agents reduce the effect of the polymer-filler interaction responsible for creping by reacting with and chemically bonding to the silica or by being strongly attached to the silica surface by physical bonds such as hydrogen bonds or van der Walls forces.

Various processes for preparing finely divided organosiloxane elastomer bases are well known in the art and are not part of the present invention.

In accordance with the method of the present invention, a finely divided non-creping silanol-containing organosiloxane elastomer base is fluidized and blended with at least one of the present capping reactants. During this operation the mixture is heated and the pressure in the enclosed mixing chamber is reduced to below atmospheric pressure to remove unreacted capping agent. The mixing chamber is completely enclosed because it is necessary to maintain the base in a fluidized state and for facilitating removal of unreacted capping agent.

During reaction of the elastomer base in accordance with the present method, the concentrations of unreacted silanol and/or silicon-bonded hydrolyzable groups in the base are typically reduced to about 50 to 60 percent of their value in the initial elastomer base.

While not wishing to be bound be any theory, it appears that the improvement in properties exhibited by cured articles prepared from bases prepared using the present method is due at least in part to this reduction in the concentration of silanol groups and silicon-bonded hydrolyzable groups that react to form silanol groups in the presence of moisture. The silanol groups remaining in the composition can react with the oxygen atoms linking the siloxane units in the polydimethylsiloxane molecules, resulting in rearrangement of the molecular structure. These rearrangement reactions lead to formation of a secondary network of bonds, resulting in higher compression set values. In accordance with this theory, a reduction in the concentration of available silanol groups should result in improved, i.e. lower, compression set values in the cured elastomer.

The reaction of the silanol groups in the curable organosiloxane composition with the monofunctional organosilicon compound, referred to herein as the capping reactant or capping agent, is conducted while the finely divided base is maintained in a fluidized state at a temperature sufficient to facilitate the reaction by removing the by-products of the capping reaction between the silanol groups and the organosilicon compound but not so high as to cause volatilization of the capping agent. This temperature is preferably from 30° to 100° C.

The curable composition can be maintained in a fluidized state by subjecting it to high shear in an enclosed mixing chamber containing at least one rapidly rotating blade. Mixers capable of generating the required level of shear are described in greater detail in a subsequent section of this specification. The manner in which the capping reactant is added to the finely divided curable organosiloxane composition is not critical. To facilitate the reaction between the silanol groups and the capping reactant the reactant is preferably added in a finely divided form, such as atomized droplets.

The mixture of base and capping reactant(s) is heated in a fluidized state for a time sufficient to ensure a substantially complete reaction, which typically requires from about 3 to about 6 minutes. The time required will be a function of a number of variables, including the type of capping reactant and the volume of material in-the mixing chamber.

The organosilicon compounds used as capping reactants are represented by the formulae $R^1_3SiX$ and $(R^1_3Si)_2NR^2$. In these formulae each $R^1$ is individually selected from monovalent hydrocarbon radicals free of ethylenic unsaturation, $R^2$ is selected from the group consisting of hydrogen and $R^1$ and X represents a hydrolyzable group. Hydrolyzable groups that can be represented by X include but are not limited to alkoxy, carboxy, amino, amido, and ketoximo, and the hydrocarbon radical represented by $R^2$ is preferably alkyl containing from 1 to 5 carbon atoms or vinyl. $R^2$ is most preferably hydrogen, methyl or ethyl.

Examples of monovalent hydrocarbon radicals that can be represented by $R^1$ and $R^2$ include but are not limited to alkyl radicals containing from 1 to 12 or more carbon atoms, cycloalkyl radicals, and aromatic radicals such as phenyl and benzyl. The hydrocarbon radical can contain inert substituents such as halogen atoms that will not react during the capping reaction with silanol groups. 3,3,3-trifluoropropyl is a preferred substituted hydrocarbon radical.

The hydrocarbon radicals represented by $R^1$ and $R^2$ are preferably alkyl containing from 1 to about 4 carbon atoms, phenyl or 3,3,3-trifluoropropyl and X is preferably alkoxy. These hydrocarbon radicals are most preferably methyl or ethyl, based on the availability and cost of the compounds, and X is most preferably methoxy or ethoxy, based on the low boiling points of the alcohol produced as a by-product of the reaction between the organosilicon compound and a silanol group.

Preferred capping reactants are hexamethyldisilazane and trimethylmethoxysilane.

The amount of capping reactant that is added to the finely divided rubber base is at least sufficient to react with the combination of silanol and silicon-bonded hydrolyzable groups present in the curable organosiloxane composition.

The concentration of capping agent is typically from 3 to 35 percent, based on the weight of silica present in the elastomer base.

If the organosiloxane base contains silicon bonded hydrolyzable groups, sufficient water is optionally added together with the capping reactant to convert these hydrolyzable groups to silanol groups.

The ingredients of the curable organosiloxane elastomer bases that are reacted with capping agents in accordance with the present method are described in the following sections of this specification.

The Polydiorganosiloxane

The curable ingredient of the organosiloxane elastomer bases that are treated in accordance with the present invention is at least one relatively high molecular weight polydiorganosiloxane having the consistency of a gum. The molecular weight of this polymer is sufficient to impart a viscosity of from about 100 to about 2,000,000 poise (10 to 200,000 Pa.s), measured at 25° C.

The viscosity of high consistency polydiorganosiloxane bases is typically expressed in terms of a plasticity number that is determined as described in the American Society of Testing or Materials (ASTM) test method no. 926. The plasticity number is defined as the thickness in millimeters× 100 of a cylindrical test specimen after the specimen has been subjected to a compressive load of 49 Newtons for a specified period of time at a specified temperature. The test samples typically measure 2 $cm^3$ in volume and 10 mm. high. Silica-filled bases suitable for treatment in accordance with the present method typically exhibit plasticity values in the range of 2.0 to 6.4 mm.

The polydiorganosiloxane ingredient of the present compositions can be represented by the general formula $ZR^3R^4SiO(R^3R^4SiO)_nSiR^3R^4Z$, wherein $R^3$ and $R^4$ represent identical or different monovalent substituted or unsubstituted hydrocarbon radicals, the average number of repeating units in the polymer, represented by n, is selected to provide the desired viscosity in range of 100 to 2,000,000 poise.

The molecular weight of the polydiorganosiloxane together with the types and concentrations of repeating units in this polymer contribute to the properties of the final cured elastomer. The terminal group Z represents a saturated or ethylenically unsaturated hydrocarbon radical or a hydroxyl group.

The relationship between the value of n in the general formula and the viscosity of the polydiorganosiloxane is dependent upon the type of hydrocarbon radicals represented by $R^3$ and $R^4$. For polydimethylsiloxanes the value of n is typically from 500 to several thousand.

The type of group represented by Z is determined by the curing reaction used to convert the polydiorganosiloxane to a cured elastomer. For example, when the composition is to be cured by a hydrosilation reaction with an organohydrogensiloxane or a vinyl-specific peroxide, Z is typically vinyl or other alkenyl radical.

The hydrocarbon radicals represented by $R^3$ and $R^4$ include alkyl and substituted alkyl radicals containing from 1 to 20 carbon atoms, alkenyl radicals such as vinyl and 5-hexenyl, cycloalkyl radicals such as cyclohexyl, and aromatic hydrocarbon radicals such as phenyl, benzyl and tolyl. Suitable substituents that can be present on $R^3$ and/or $R^4$ include but are not limited to the halogens, alkoxy and cyano groups. Preferred hydrocarbon radicals are lower alkyl containing from 1 to 4 carbon atoms, phenyl, and halogen-substituted alkyl such as 3,3,3-trifluoropropyl. Most preferably $R^3$ represents a methyl radical, $R^4$ represents at least one of methyl, phenyl and 3,3,3-trifluoropropyl radicals, and Z and optionally one or more of the $R^4$ radicals represent alkenyl radicals.

The polydiorganosiloxane ingredient of the present compositions can be a homopolymer, a copolymer or a mixture containing two or more different homopolymers and/or copolymers. It should be evident that copolymer molecules contain two or more different types of diorganosiloxane units, and that the molar ratios of the various units is determined by the properties of cured elastomers prepared from these compositions.

When the composition is intended to be cured by a hydrosilation reaction, at least a portion of the polydiorganosiloxane ingredient can be a copolymer wherein Z represents an alkenyl radical and a portion of the $R^3$ radicals on non-terminal silicon atoms are optionally ethylenically unsaturated radicals such as vinyl and hexenyl.

Methods for preparing high consistency (or "gum" type) polydiorganosiloxanes exhibiting viscosities of from about 100 to about 2,000,000 poise (10 to 200,000 Pa.s) are sufficiently well known that they do not require a detailed discussion in this specification. One method for preparing these polymers is by the acid- or base-catalyzed polymerization of cyclic diorganosiloxanes that typically contain three or four siloxane units per molecule. A second method comprises replacing the cyclic polysiloxanes with the corresponding diorganodihalosilane(s) and an acid acceptor. The polymerization is conducted under conditions that will yield the desired molecular weight.

The silanol terminated polydiorganosiloxane gum can be any of the polydiorganosiloxanes which are known in the art for the preparation of silicone elastomer bases such as silanol terminated poly(co- dimethylsiloxane-methylphenylsiloxane-methylvinylsiloxane), silanol terminated polydimethylsiloxane, silanol terminated poly(co-dimethylsiloxane-methylvinylsilaxane), silanol terminated poly(methyl-3,3,3-trifluoropropylsiloxane), silanol terminated poly(co-methylvinylsiloxane-methyl-3,3,3- trifluoropropylsiloxane), and mixtures of these silanol terminated polydiorganosiloxanes with one or more of triorganosilyl terminated polydiorganosiloxanes such as dimethylvinylsiloxy terminated poly-(methyl-3,3,3-trifluoropropylsiloxane), dimethylvinylsiloxy terminated polydimethylsiloxane, methylphenylvinylsiloxy terminated polydimethylsiloxane, dimethylvinylsiloxy terminated poly(co-dimethylsiloxane-methylvinylsiloxane), and various mixtures thereof. As indicated in the preceding paragraphs of this section, at least a portion of the terminal silanol groups can be replaced by alkenyl radicals.

The Reinforcing Filler

The reinforcing fillers used in the elastomer bases that are treated in accordance with the present method are finely divided fumed and precipitated forms of silica or a silica aerogel. Reinforcing fillers are typically characterized by surface areas greater than about 50 m²/gram. The fumed form of silica is a preferred reinforcing filler based on its availability, cost and high surface area, which can be up to 600 m²/gram.

Preparation of the Elastomer Base

During preparation of the organosiloxane elastomer bases that are reacted in accordance with the present method the silica fillers are treated with liquid organosilicon compounds containing silanol groups or hydrolyzable precursors of silanol groups to prevent the process referred to in this specification as "creping" or "crepe hardening".

Organosilicon compounds that can be used as filler treating agents during preparation of the organosiloxane elastomer bases are sometimes referred to as anti-creping agents and include but are not limited to low molecular weight liquid silanol-and alkoxy-terminated polydiorganosiloxanes, and hexaorganodisilazanes. Depending upon the properties desired in the final cured elastomer, some of the silicon-bonded hydrocarbon radicals in all or a portion of the filler treating agent can contain substituents such as carbon-carbon double bonds that react during curing of the composition.

The reinforcing filler is typically reacted with from 10 to about 35 weight percent, based on filler weight, of the filler treating agent. The silica is typically maintained at a temperature of from 100° to about 200° C. during the treatment process.

In accordance with a preferred method for preparing the organosiloxane elastomer base, the silica is fluidized in an enclosed heated mixing chamber prior to introduction of the silica treating agent, polydiorganosiloxane gum and any additional ingredients described in the following section of this specification.

The resultant mixture is maintained in a fluidized state by suitable means while the gum is broken into fragments and the agglomerated silica particles are reduced to single particle aggregates that are incorporated into the polymer fragments using suitable shearing means, such as rapidly rotating cutting or chopper blades, for a time sufficient to obtain the desired particle size. The temperature in the mixing chamber is maintained between 30° and about 150° C. during this process. The change in particle size of the curable base can be followed by periodically withdrawing samples from the mixing chamber or by monitoring the power demand of the electrically powered mixing blade(s) in the mixing chamber that maintain the contents in the desired fluidized state.

Optional Ingredients

In addition to the polydiorganosiloxane(s) and treated reinforcing filler a number of additional ingredients can be present in the curable organosiloxane base to modify the processability of the base or the properties of cured elastomers prepared from the base. These additional ingredients include but are not limited to extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as antimony compounds, hydrated aluminum oxide, magnesium compounds and halogenated hydrocarbons, adhesion promoters and resinous organosiloxane copolymers as reinforcing agents. These resinous reinforcing agents typically contain trimethylsiloxy, dimethylvinylsiloxy and $SiO_{4/2}$ units, and are well known materials. Other resinous organosiloxane copolymers containing phenylsiloxane units can be present to impart heat stability of cured elastomers prepared from the present compositions.

The Preferred Mixing Apparatus

Any mixing apparatus capable of maintaining a finely divided curable organosiloxane composition in a fluidized state at a temperature of from 30° to about 150° C. can be used to prepare the elastomer base and treat it in accordance with the present method. Suitable mixers include but are not limited to Waring(R) blenders containing a high speed shearing blade at the bottom of a vertically oriented conical chamber and mixers manufactured by Rheinstahl Henschel AG, Kassel, Germany.

Mixer/granulators manufactured by Littleford Bros. Inc. Florence, Ky. are preferred mixing devices. These mixers are referred to as "plow" or "plowshare" mixers due to the presence of at least one triangular or "T"-shaped "plow"

blade located in a horizontally oriented cylindrical mixing chamber. The plow blade rotates on the horizontal axis of the chamber with the edge of the blade close to the perimeter of the chamber. In addition to maintaining the silica and other ingredients of the present compositions in a fluidized state. The plow blade is also believed to agglomerate the ultimate particles produced by the high speed shearing blade(s), also referred to as chopper blades, present in the chamber to achieve the desired final particle size.

The speed of the plow blade required to maintain the silica in a fluidized form is typically from 30 to about 200 revolutions per minute, and is dependent upon the capacity of the mixing chamber and the particle size range of the final powder. A speed of from 80 to 180 revolutions per minute is preferred using a 130 liter-capacity mixing chamber. The speed would be proportionately slower for a larger capacity mixer.

The mixing chamber also contains at least one high speed chopping blade to provide the shearing force required to incorporate the filler and other additives into polydiorganosiloxane gum and concurrently form a finely divided powder. A preferred embodiment of a mixing chamber contains at least one conical array of 3 blades rotating on a single shaft and ranging in diameter from 6 to 9 inches (15 to 23 cm), the smallest diameter blade being located closest to the mixer wall.

It is believed that the speed of the chopping blade(s) should be between about 2000 to about 4000 revolutions per minute when it is desired to prepare a composition of the present invention with a processing time of up to 30 minutes. The processing time period may vary somewhat depending upon the radius of the blade and the volume of material in the mixer. Smaller diameter blades typically must rotate at a higher speed to impart the same level of shear to the filler/polymer mixture. To minimize processing time it is preferable to use the longest chopper blades that will not interfere with rotation of the plow blades located on either side of the chopper blades.

Preparation of Powdered Organosiloxane Compositions

In accordance with the present method for preparing an organosiloxane elastomer base in the form of a flowable powder, at least a portion of the reinforcing filler is maintained in a highly turbulent, fluidized state in a mixing chamber by stirring or otherwise agitating the filler particles sufficiently to entrap the air or other gas in the chamber between the filler particles and maintain the particles suspended in the mixing chamber. The suspended filler particles assume the characteristics of a fluidized bed with respect to the ability of the suspended filler particles to react with the ammonia source and the filler treating agent.

It appears that the initial particle size of the high consistency polydiorganosiloxane added to the mixing chamber does not substantially alter processing time or the properties of either the flowable powder or cured elastomers prepared from this powder. The initial polydiorganosiloxane can be in any form capable of being conveniently inserted into the mixer chamber.

Any additional ingredients referred to in the preceding section of this specification can be added to the mixing chamber together with the filler or with the polydiorganosiloxane.

The physical properties of elastomers prepared from the present compositions are maximized using the preferred Littleford mixer if all of the polydiorganosiloxane is added as a single portion rather than gradually over a period of time.

To reduce the capacity of the mixing chamber required to prepare a given amount of the organosiloxane base, a portion of the filler is added initially, due to the large increase in filler volume during fluidization. This volume decreases substantially as the silica is incorporated into the particles of polydiorganosiloxane in the mixing chamber. The remaining filler is placed in a hopper or other suitable dispensing container and allowed to drop into the chamber as the volume of silica initially present in the mixer decreases due to incorporation of the filler into the polymer. This method of filler addition utilizes the full volume of the mixing chamber throughout the process of preparing the finely divided organosiloxane composition.

In some instances, particularly when volatile filler treating agents are used, it is desirable to maintain a flow of an inert gas such as nitrogen through the mixer chamber for at least a portion of the present method.

One way of following the reduction and subsequent increase in the particle size of the polydiorganosiloxane that occurs during the preparation of the elastomer base is by plotting the amount of electrical power consumed by the motor(s) driving the chopper blades as a function of time. This power consumption level increases sharply following addition of the polydiorganosiloxane(s) and reaches a maximum when all of the reinforcing filler has entered the mixer chamber, which for a 130 liter capacity Littleford mixer requires from 1 to about 20 minutes, depending upon the amount of filler to be incorporated into the polydiorganosiloxane. Once all of the silica or other reinforcing filler has entered the mixer chamber the power consumed by the chopper blade motor(s) decreases at about the same rate that it increased as the filler was entering the mixer chamber.

There is a noticeable leveling off, referred to as a plateau, in the downward slope of the power consumption curve for the chopper motor(s) that occurs from about 2 to about 50 minutes after addition of the polydiorganosiloxane, depending at least in part on the capacity of the mixer chamber and the speed of the plow and chopper blades. Beyond this plateau the power consumed by the motor(s) driving the plow blades begins to increase, but at a rate considerably less than that observed for the chopper blade motor(s) during addition of filler to the mixer chamber. The plateau in the power consumption curve of the chopper blade motor has been found to correspond to the minimum particle size polydiorganosiloxane/filler particles. At this point the particles in the mixing chamber are aggregates measuring from 10 to about 700 micrometers in diameter with an ultimate particle size of from 2 to about 100 micrometers.

If the blending operation is allowed to proceed to the point where the power consumption rate of the plow blade motor begins to increase, the average particle size of the blend begins to increase as additional particle agglomeration occurs. When a base exhibiting the desired particle size has been prepared heating of the reactor is discontinued while the plow blade(s) are rotated until the temperature of the product decreases to 60 degrees or less. The resultant finely divided organosiloxane base is discharged from the mixer and stored for subsequent treatment in accordance with the present invention or mixing and heating of the base is continued as one or more capping agents of this invention are introduced into the mixing chamber while the temperature of the mixture is maintained within the range from 60° to 100° C.

EXAMPLES

The following examples describe preferred embodiments of the present method and should not be interpreted as limiting the invention as defined in the accompanying

Example 1

This example demonstrates the effect of capping the silanol groups present in the powder form of a curable organosiloxane composition on the physical properties, particularly compression set, of the cured elastomer prepared from the composition.

The mixing apparatus used to prepare the curable composition consisted of a 130 liter-capacity cylindrical mixing chamber equipped with four "T"-shaped scraper blades (referred to as plow blades) attached to a shaft located on the central axis of the cylinder. The edge of each blade rotated at a distance of 0.6 cm. from the perimeter of the cylindrical mixing chamber. From the cylindrical wall of the mixing chamber projected a shaft on which was mounted a conical array of ten chopper blades arranged in sets of two, with the blade of adjacent sets offset at an angle of 90° with respect to one another. The array consisted of two sets of two 6 inch - diameter blades, one set of two 7 inch -diameter blades and one set of two 9 inch - diameter blade. The smallest diameter blades were located closest to the wall of the mixer chamber.

The top of the mixer chamber contained a cylindrical stack through which material could enter or leave the chamber. The mixer was identified as model FM-130D, manufactured by Littleford Brothers, Inc.

The mixer chamber was equipped with a jacket that allowed the contents to be heated using steam or cooled using water or other liquid. Unless otherwise indicated in the following examples, all of the compositions were prepared using a chopper blade speed of 3400 RPM and a plow blade speed of 170 RPM.

36 parts of a fumed silica having a nominal surface area of 250 m² per gram were placed in the mixing chamber following which all of the blades were activated. At this time 80 parts of a dimethylvinylsiloxy-terminated polydimethylsiloxane gum containing 0.142 mole percent of methylvinylsiloxane units and exhibiting a viscosity of about 300,000 poise (3000 Pa.s), and 20 parts of a dimethylvinylsiloxy-terminated polydimethylsiloxane exhibiting a viscosity of 300,000 poise were added to the mixing chamber and blended for 3 minutes. At this time 12 parts of the same fumed silica were added and a mixture of the following silica treating agents was sprayed into the mixing chamber: 1.2 parts of vinyltrimethoxysilane, 4.8 parts of phenyltrimethoxysilane and 8.4 parts of the equilibration product obtained by reacting equimolar amounts of methyltrimethoxysilane and dimethylsiloxane units in the form of cyclic dimethylsiloxanes. The average molecule of the equilibration product used as one of the silica treating agents contained one monomethylsiloxane (methylsilsesquioxane-)unit and one dimethylsiloxane unit.

0.02 part of manganese octoate was included in the mixture of silica treating agents as a heat stabilizer.

Mixing of the resultant blend was continued for three minutes, at which time 0.48 part of ammonium carbonate was added to the mixing chamber as a silica treating catalyst. After mixing for two minutes steam was admitted into the jacket of the mixing chamber and the temperature inside to mixing chamber increased to 110° C. Mixing was continued and samples were withdrawn periodically until the average particle size was from 0.01 to 0.1 mm. This required a total mixing time of 17.5 minutes.

At this time a sample of elastomer base was taken from the mixing chamber and will be referred to hereinafter as the "control". Following removal of the control sample, 1 part of boiling water was added together with 0.05 part of hexamethyldisilazane as the hydrolysis catalyst and mixing was continued for 2 minutes, at which time a stream of nitrogen was directed through the mixing chamber. Following three minutes of mixing and a total mixing time of 22 minutes, a sample of material was taken from the mixing chamber and will be referred to hereinafter as the "hydrolysis". At this time nitrogen flow was discontinued and 13.8 parts of hexamethyldisilazane were added to the mixing chamber as the capping agent, which was equivalent to 28.9 parts of capping agent per 100 parts of silica.

Mixing was continued for an additional three minutes, for a total mixing time of 25 minutes, at which time a sample referred to hereinafter as "capped 1" was removed from the mixing chamber. A second sample, referred to as "capped 2" was removed following an additional three minutes of mixing, for a total mixing time of 28 minutes. At this time the temperature in the mixing chamber was 116° C. The final composition was in the form of a free-flowing powder.

The samples of particles identified as "control", "hydrolysis", "capped 1" and "capped 2" were heated on trays in an air circulating oven for 30 minutes at 125° C. The samples were then cooled to room temperature and massed using a 2-roll mill. 0.7 parts by weight of 2,5 bis(tert-butyl peroxy)-2,5-dimethylhexane per 100 parts of polydiorganosiloxane in the composition was then added to each of the massed compositions and the resultant mixtures were blended for three minutes on an unheated mill. The sheets were removed from the mill and cured for 15 minutes in a press heated to 177° C.

Samples for measurement of tensile strength, elongation, durometer hardness and compression set were cut from the cured sheets. The properties were measured in accordance with the appropriate ASTM (American Society for Testing of Materials) test procedures. The conditions for compression of the samples during the compression set evaluation were 22 hours at 177° C. and the samples were allowed to relax for 30 minutes prior to being measured.

The physical properties of the cured samples are recorded in Table 1.

TABLE 1

| Sample | Durometer Shore A | Tensile psi/Mpa | Elongation % | C.S. % |
|---|---|---|---|---|
| Control | 63 | 996/6.87 | 316 | 74.4 |
| Hydrolysis | 67 | 1438/9.92 | 372 | 33.9 |
| Capped 1 | 63 | 1280/8.83 | 344 | 17.7 |
| Capped 2 | 63 | 1407/9.70 | 354 | 16.1 |

The data in Table 1 demonstrate that the prior art requirement for silazanes containing an alkenyl radical to achieve a reduction in compression set during post treatment of elastomer bases does not apply to the present method. This requirement is contained in U.S. Pat. No. 5,081,172, which issued to Chaffee et al. on Jan. 14, 1992.

Example 2

This example demonstrates the additional beneficial reduction of compression set achieved by capping of residual silanol groups in an organosiloxane composition that has been formulated with the intent of reducing its compression set by using a polydiorganosiloxane containing randomly spaced vinyl radicals on non-terminal silicon atoms.

A curable organosiloxane base was prepared using the procedure and mixing device described in Example 1 using the following ingredients: 100 parts of a dimethylvinylsiloxy-terminated polydimethylsiloxane containing 0.142 mole percent of methylvinylsiloxane units and exhibiting a viscosity of 300,000 poise (30,000 Pa.s), 40 parts of fumed silica, 7.85 parts of a hydroxyl terminated liquid polydimethylsiloxane containing 4 weight percent of hydroxyl groups as the filler treating agent and 0.48 parts of ammonium carbonate as the filler treatment catalyst and 1.19 parts of hexamethyldisilazane capping agent, compared with 13.8 parts in Example 1 (equivalent to a reduction of from 28.9 parts to 2.98 parts of hexamethyldisilazane per 100 parts of silica).

The temperature in the mixing chamber was 31.4° C. when 40 parts of fumed silica with a nominal surface area of 250 m² per gram were placed in the mixing chamber and all of the mixer blades were activated. 100 parts of polymer were added and mixed for three minutes, at which time 7.85 parts of the filler treating agent were sprayed into the mixing chamber. The ingredients in the mixing chamber were blended for an additional 3 minutes, at which time 0.05 parts of ammonium carbonate were added as a catalyst for reacting the silanol groups on silica with those on the treating agent. Following a total mixing time of 20 minutes the composition was in the form of a finely divided non-dusting powder. A sample was withdrawn at this time and labeled "control". The speed of the plow blade was then reduced to 60 percent of the original and 1.19 parts per 100 parts polymer of the capping agent, hexamethyldisilazane, was added. Steam was then admitted into the jacket of the mixer. Mixing was continued for an additional 6 minutes, at which time a sample of material was withdrawn from the mixing chamber and labeled "capped". The total mixing time at this point was 28.6 minutes.

Mixing was continued for a total time of 31.5 minutes, at which time a flow of nitrogen through the mixing chamber was begun. Following a total mixing time of 55 minutes the temperature in the mixing chamber was 111° C. The contents of the mixing chamber were removed as a free flowing powder.

The samples of particles identified as "control" and "capped" were heated on trays in an air circulating oven for 30 minutes at 125° C. to ensure removal of any ammonia. The samples were then cooled to room temperature and massed using a 2-roll mill. 0.7 parts by weight of 2,5 bis(tert-butyl peroxy)-2,5-dimethylhexane per 100 parts of polydiorganosiloxane in the composition was then added to each of the massed compositions and the resultant mixtures were blended for three minutes on an unheated mill. The sheets were removed from the mill and cured for 15 minutes in a press heated to 177° C.

The tensile strength, elongation and compression set of the cured samples were measured as described in Example 1 and the results are recorded in the following Table 2.

TABLE 2

| Sample | Durometer Shore A | Tensile psi/Mpa | Elongation % | C.S. % |
| --- | --- | --- | --- | --- |
| Control | 46 | 981/6.77 | 435 | 33.91 |
| Capped | 44 | 97.3/6.71 | 491 | 20.16 |

The data in Table 2 demonstrate that when the composition of a curable organosiloxane composition is altered to decrease compression set of the control sample, capping of the residual silanol groups using a relatively small amount of capping agent resulted in an additional 40.5% reduction in compression set relative to the control sample. Compression set values can be reduced by including a polydiorganosiloxane containing vinyl radicals randomly spaced along the polymer chain as in the present example or by reducing the relative concentration of reinforcing silica in the composition.

The data in Tables 1 and 2 demonstrate that a reduction of residual hydroxyl groups in a curable organosiloxane composition results in a reduction of siloxane chain rearrangement reactions at high temperatures. These rearrangement reactions are considered responsible for an increase in the compression set of cured elastomers prepared using these compositions.

That which is claimed is:

1. A method for reducing the compression set of a cured elastomer prepared from a curable organosiloxane elastomer base in the form of a free flowing powder said method comprising the following sequential steps:

1) maintaining in the fluidized state a finely divided form of a previously prepared non-creeping organosiloxane elastomer base comprising a curable polyorganosiloxane gum and reinforcing silica filler having silanol groups on the surface thereof, wherein a portion of said silanol groups sufficient to reduce creeping have been converted to organosiloxy groups;

2) blending said base with an organosilicon compound of the general formula $R^1_3SiX$ or $(R^1_3Si)_2NR^2$ under conditions sufficient to react said compound with at least a portion of the residual silanol groups in said base, wherein the molar ratio of said organosilicon compound to the combined concentration of silanol and silicon-bonded hydrolyzable groups present in said base is at least 0.5:1, and 3) isolating the resultant organosiloxane composition as a free flowing powder;

wherein each $R^1$ is individually selected from monovalent hydrocarbon radicals free of ethylenic unsaturation, X represents a hydrolyzable group, $R^2$ is selected from the group consisting of hydrogen and $R^1$.

2. A method according to claim 1 wherein $R^1$ is selected from the group consisting of unsubstituted and substituted alkyl radicals containing from 1 to 12 carbon atoms, cycloalkyl radicals, and aromatic hydrocarbon radicals;

X is selected from the group consisting of alkoxy, carboxy, amino, amido and ketoximo groups;

$R^2$ is hydrogen or $R^1$;

said polyorganosiloxane exhibits the formula $ZR^3R^4SiO(R^3R^4SiO)_nSiR^3R^4Z$, wherein $R^3$ and $R^4$ represent identical or different monovalent substituted or unsubstituted hydrocarbon radicals, Z is selected from the group consisting of monovalent hydrocarbon radicals and the silanol group and n represents a degree of polymerization equivalent to viscosity values of 100 to 2,000,000 poise; said base being maintained at a temperature of from 30° to 100° C. during the reaction of said base with said organosilicon compound and the concentration of said organosilicon compound is from 3 to 35 weight percent, based on the weight of silica present in said base.

3. A method according to claim 2 wherein $R^1$ is methyl, X is methoxy or ethoxy, $R^3$ and $R^4$ are selected from the group consisting of unsubstituted and substituted alkyl radicals containing from 1 to 4 carbon atoms and phenyl radicals; and an amount of water sufficient to convert any silicon-bonded hydrolyzable groups present in said base to silanol groups is added together with said organosilicon compound.

4. A method according to claim 3 wherein $R^3$ is methyl, and said organosilicon compound is selected from the group consisting of hexamethyldisilazane and trimethylmethoxysilane.

* * * * *